US006652038B1

(12) United States Patent
Frye

(10) Patent No.: US 6,652,038 B1
(45) Date of Patent: Nov. 25, 2003

(54) TOWING AND TOWED VEHICLE BRAKING SYSTEM

(75) Inventor: David E. Frye, Quincy, IL (US)

(73) Assignee: Titan International, Inc., Quincy, IL (US)

( * ) Notice: Subject to any disclaimer, the term of this patent is extended or adjusted under 35 U.S.C. 154(b) by 0 days.

(21) Appl. No.: 10/006,106

(22) Filed: Dec. 4, 2001

(51) Int. Cl.$^7$ .............................................. B60T 13/00
(52) U.S. Cl. ........................................................ 303/7
(58) Field of Search ........................ 303/7, 9.61, 9.62, 303/9.63, 9.65; 188/3 H

(56) References Cited

U.S. PATENT DOCUMENTS

| | | | |
|---|---|---|---|
| 2,856,036 A | | 10/1958 | Mullen |
| 2,870,876 A | | 1/1959 | Pease |
| 3,053,348 A | | 9/1962 | Stair |
| 3,486,799 A | | 12/1969 | Greentree |
| 3,507,541 A | * | 4/1970 | Ayers, Jr. ......................... 303/7 |
| 3,738,710 A | | 6/1973 | Pokrinchak et al. |
| 3,771,838 A | * | 11/1973 | Rossigon et al. ............... 303/7 |
| 3,790,807 A | * | 2/1974 | Rossigno ....................... 303/7 |
| 3,810,521 A | | 5/1974 | Sparr |
| 3,836,205 A | * | 9/1974 | Schwerin ....................... 303/7 |
| 3,861,489 A | | 1/1975 | Lang et al. |
| 3,897,979 A | | 8/1975 | Vangalis et al. |
| 3,907,071 A | | 9/1975 | Wells |
| 3,908,782 A | | 9/1975 | Lang et al. |
| 3,909,075 A | | 9/1975 | Pittet, Jr. et al. |
| 3,912,334 A | * | 10/1975 | Schwerin et al. ............... 303/7 |
| 3,951,464 A | | 4/1976 | Donahue et al. |
| 3,955,652 A | | 5/1976 | Nilsson et al. |
| 4,023,864 A | | 5/1977 | Lang et al. |
| 4,052,695 A | | 10/1977 | Myers |
| 4,066,996 A | | 1/1978 | Davis |
| 4,076,325 A | * | 2/1978 | Bray .............................. 303/7 |
| 4,099,790 A | * | 7/1978 | Hipps ............................ 303/7 |
| 4,109,968 A | * | 8/1978 | Wood ............................ 303/7 |
| 4,196,936 A | | 4/1980 | Snyder |
| 4,222,614 A | | 9/1980 | Spechko |
| 4,721,344 A | | 1/1988 | Frait et al. |
| 4,726,627 A | | 2/1988 | Frait et al. |
| 4,984,852 A | | 1/1991 | McNinch, Jr. |
| 5,005,130 A | | 4/1991 | Breen et al. |
| 5,116,107 A | * | 5/1992 | Hull et al. ..................... 303/7 |
| 5,286,094 A | * | 2/1994 | Milner .......................... 303/7 |
| 5,480,215 A | * | 1/1996 | Stender et al. ................. 303/7 |
| 5,779,324 A | | 7/1998 | Cords et al. |
| 5,954,164 A | | 9/1999 | Latham |
| 6,012,780 A | | 1/2000 | Duvernay |
| 6,296,323 B1 | | 10/2001 | Cords |
| 6,364,432 B1 | | 4/2002 | Mixon |
| 6,367,588 B1 | * | 4/2002 | Robertson et al. ...... 188/1.11 E |

\* cited by examiner

Primary Examiner—Jack Lavinder
Assistant Examiner—Xuan Lan Nguyen
(74) Attorney, Agent, or Firm—Daniel Rosenberg; Kent Herink; Davis Law Firm

(57) ABSTRACT

A brake system for a towed and towing vehicle combination allowing for application of the brakes of the towed vehicle in proportion to application of the brakes of the towing vehicle. The combination utilizes a signal from the towing vehicle to generate a proportional braking signal in the towed vehicle. In particular, the towed vehicle braking system includes a proportional relief valve that controls the braking pressure on the towed vehicle in response to an electrical signal from the towing vehicle. The system utilizes a control program that signals a power unit in operable communication with the towed vehicle brakes to operate at full power for a first period of time and at a reduced power for a second period of time.

11 Claims, 3 Drawing Sheets

TOWING VEHICLE

TOWED VEHICLE

TOWING AND TOWED VEHICLE BRAKING SYSTEM

BACKGROUND OF THE INVENTION

The present invention relates to a towing and towed vehicle braking system, and in particular, to a towing and towed vehicle braking system that utilizes a proportional relief valve to apply a braking force to the towed vehicle brakes in response to a signal from the towing vehicles braking system The number of vehicles on the roadways towing trailers and other vehicles continues to increase, especially with the proliferation of sport utility vehicles. In any towing and towed vehicle combination, the vehicles must stop and start together. For these reasons state and federal regulations require that towed vehicles over a certain gross vehicle weight (GVW) provide brakes on the towed vehicle. Regulatory schemes vary such that some regulations require trailer brakes for trailers with a GVW of 1,000 pounds and above. Federal law provides not only for the inclusion of brakes on towed vehicles, but also that the operator of the towing vehicle controls the towed vehicle's brakes. In addition, the towed vehicle must include some mechanism to activate the towed vehicle brakes in the event that the towed vehicle breaks away from the towing vehicle.

To meet these demands manufactures of towed vehicle braking systems use a variety of types of brake systems. Hydraulic surge-brakes comprise one such type. Typically surge brakes use mechanical devices to actuate a brake cylinder, usually a master brake cylinder, in response to inertial pressure differential between the towing vehicle and the towed vehicle that develops upon deceleration of the vehicles. The simplicity of surge brakes, however, often leads to drawbacks. The brakes generally lack the ability to adjust braking force in response to changes in trailer loads, and lack the ability to vary braking force in proportion to the braking force applied by the operator of the towing vehicle. These drawbacks can result in the towed vehicle stopping faster than the towing vehicle in which case the towed vehicle drags the towing vehicle, or the opposite can result whereby the towing vehicle stops faster than the towed vehicle causing the towed vehicle to push the towing vehicle. In either case,.the condition can substantially impair the ability of the operator to maintain control. Furthermore, in many cases conventional surge brakes no longer meet the stricter federal guidelines.

Other types of brakes used with towing vehicles include electrical brakes, electric over hydraulic, vacuum over hydraulic, and air over hydraulic. However, in addition to the drawbacks mentioned in connection with surge brakes, these other systems each suffer from substantial drawbacks. For instance, electric brakes use an electromagnet working against a disc, and through mechanical leverage apply drum brakes. Electric brakes are troublesome by nature, have slow response times, and tend to be high maintenance, especially, for towing vehicles like boat trailers that encounter water, particularly salt water. In addition, the vacuum over hydraulic and air over hydraulic braking systems are extremely expensive.

In recent years hydraulic surge braking systems have undergone some improvement. In particular, U.S. Pat. No. 5,779,324 (Cords et al.) discloses a surge brake that includes a switching control box that allows the operator of the towing vehicle to select between three different braking forces. The switching control box activates one of three pressure control check valves to vary the braking force. However, the braking force is not proportionally adjustable in real-time, but instead requires manual operator intervention to vary the braking force applied to the towed vehicle.

U.S. Pat. No. 6,296,323 (Cords) discloses a complicated hydraulic brake system that utilizes a continuously variable hydraulic pressure means to provide a proportional braking force. The system relies on a variation in pressure drop, across an fixed orifice valve produced in response to variations in electrical motor speed, to vary the volume of fluid delivered to the towed vehicle braking system. However, the design of the system produces heat causing instability because as the temperature of the fluid increases viscosity drops changing the properties of the pressure drop across the orifice. Heat changes the viscosity of the brake fluid, which in turn changes the amount of braking force required to maintain a given brake-line pressure. In other words, the pressure drop across the fixed orifice creates a certain amount of heat. This heat lowers the viscosity of the brake fluid, which reduces the pressure in the brake lines at a given volume. This, in turn, requires the system to increase the pressure across the orifice, which adds more heat. Accordingly, the heat inducing nature of the system actually works against itself in its attempt to control brake pressure, thereby requiring constant adjustments.

Accordingly, a need exists for an improved towed vehicle braking system that provides for application of a proportionally variable braking force to the brakes of a towed vehicle without the drawbacks and complications of prior art systems.

SUMMARY OF THE INVENTION

An object of the present invention comprises providing an improved towing and towed vehicle braking system.

These and other objects of the present invention will become apparent to those skilled in the art upon reference to the following specification, drawings, and claims.

The present invention intends to overcome the difficulties encountered heretofore. To that end, a towing and towed vehicle braking system is provided comprised of the following components. A towing vehicle having brakes in operable communication with a towing vehicle electronic brake controller capable of transmitting a brake signal indicating application of the towing vehicles brakes. A towed vehicle coupled to the towing vehicle having brakes in operable communication with a towed vehicle electronic brake controller capable of receiving the brake signal from the towing vehicle electronic brake controller. Brake lines leading to the towed vehicle brakes. A power unit in operable communication with the towed vehicle brake controller and the brakes lines, for providing a power source to pressurize the brake lines. A brake fluid reservoir in operable communication with the power unit and the brake lines, for storage and transfer of brake fluid. A proportional relief valve in operable communication with the power unit, the towed vehicle brake controller, the brake lines, and the brake fluid reservoir, for controlling the pressure in the brake lines and thereby controlling braking force applied by the towed vehicle brakes. Wherein the proportional relief valve is sent a specific pressure setting by the towed vehicle brake controller set in response to the brake signal from the towing vehicle electronic brake controller, thereby controlling the application of the towed vehicle brakes in response to the towing vehicle brakes.

DETAILED DESCRIPTION OF THE INVENTIONS

Figure 1:
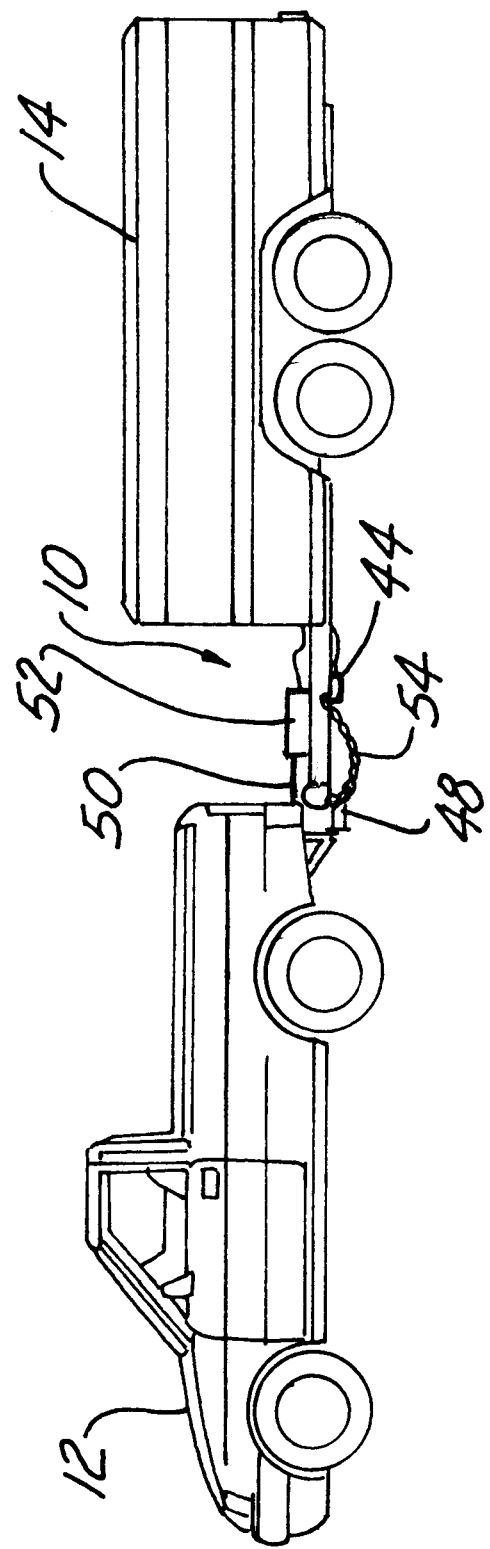
FIG. 1 is a schematic of a hydraulic brake actuating system showing a towing and towed vehicle.

In the Figures, FIG. 1 shows hydraulic brake actuating system 10 that operates between a towing vehicle 12 and a towed vehicle 14. The term towing vehicle generally refers to a lead vehicle, whether powered/unpowered or man/unmanned. The term towed vehicle generally refers to any trailing, vehicle whether powered/unpowered or man/unmanned.

Figure 2:
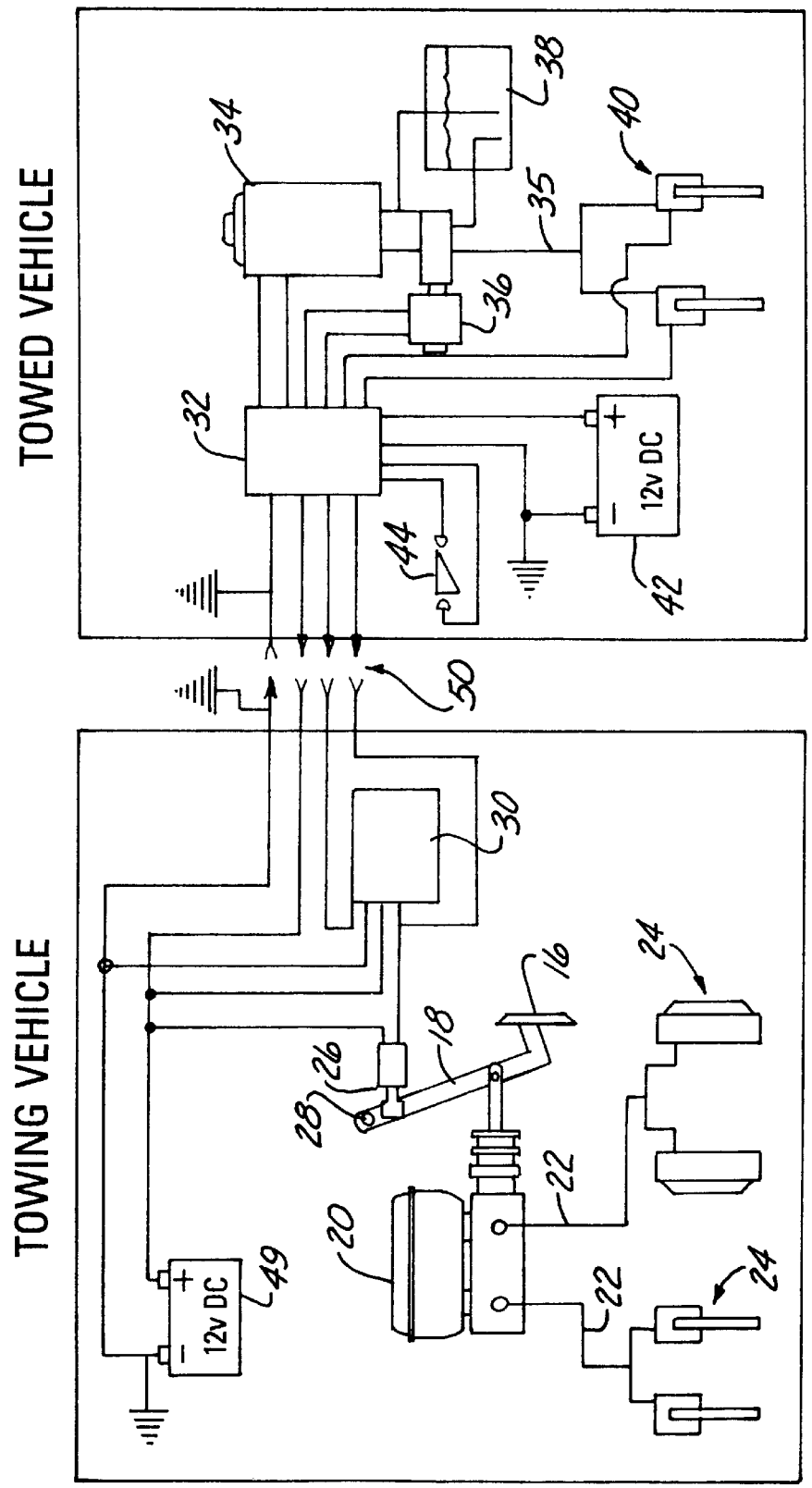
FIG. 2 is a diagram of a towing and towed vehicle using the hydraulic brake actuating system of FIG. 1.

FIG. 1 shows the towing vehicle 12 and the towed vehicle 14 coupled with a conventional coupler 48, like a ball and hitch coupler. An umbilical cord 50 provides for a releasable electrical connection between the components of the brake actuating system 10 on the towing vehicle 12 and the towed vehicle 14. A break away switch 44 is located between the towing vehicle 12 and the towed vehicle 14 to automatically apply the towed vehicle brakes in the event the towing and towed vehicles 12, 14 separate. A forward portion 52 of the towed vehicle 14 frame can be used for physically locating the components of the brake actuating system 10 located on the towed vehicle 14. Of course, those of ordinary skill in the art will understand that the physical location of these components can and will vary. Finally, chains 54 connect the towing vehicle 12 to the towing vehicle 14 thereby providing for additional safety in the case the vehicles 12, 14 accidentally disconnect. Referring to FIG. 2, foot pressure applied to the brake pedal (not shown) of the towing vehicle 12 by the operator, creates proportional pressure on a first end 16 of a lever 18 connected to a master brake cylinder 20. The master cylinder 20 creates hydraulic pressure in brake lines 22 heading to the brakes 24 at wheel ends (not shown) of the towing vehicle 12. Movement of the lever 18 activates a brake light switch actuator 26 located at a second end 28 of the lever 18. The brake light switch actuator 26 is electrically connected to brake lights (not shown) of the towing vehicle 12, and also electrically connected to a towing vehicle brake controller 30.

The towing vehicle brake controller 30, through electrical connections described in detail hereinbelow, controls the operation of the components of the hydraulic brake actuating system 10 principally located on the towing vehicle 12. The towing vehicle brake controller 30 includes a manual override mechanism (not shown) mounted in-cab to allow the operator of the towing vehicle 12 to activate the brakes of the towed vehicle 14 without operating the brakes of the towed vehicle 12 when desired or necessary. For example, the manual override mechanism could be used to eliminate sudden sway in the towed vehicle, or used in emergency situation. In addition, a battery 49 provides electrical power to the hydraulic brake actuating system 10.

Activation of the brake light switch actuator 26 sends an electrical signal to the towing vehicle brake controller 30, which in turn sends an electrical signal to an electronic control pack 32 located on the towed vehicle 14, which controls the operation of the various components of the hydraulic brake actuating system 10 located on the towed vehicle 14. The electronic control pack 32 is electronically linked to an electro-hydraulic power unit 34 and to a proportional relief valve 36. The electro-hydraulic power unit 34 is in fluid communication with a brake fluid reservoir 38, and acts as a pump thereby pressurizing brake lines 35 with brake fluid. The braking force applied to brakes 40 at wheel ends of the towed vehicle 14 varies in direct proportion to the pressure in the brake lines 35. The electronic control pack 32 sets a specific pressure setting for the proportional relief valve 36 in proportion to the intensity of the pressure applied to the brake pedal of the towing vehicle 12, except with certain embodiments of the invention that set a fixed pressure in response to application of the brakes of the towing vehicle (the details of these embodiments are described hereinbelow). The electronic control pack 32 converts a voltage signal received from the towed vehicle brake controller 30, which varies in proportion to the pressure applied to the brake pedal, into an electrical signal sent to the proportional relief valve 36 that corresponds to a specific pressure setting. The proportional relief valve 36 controls the braking force by controlling the pressure at which brake fluid flows from the brake lines 35, under pressure provided by the electro-hydraulic power unit 34, to the fluid reservoir 38. In addition, a battery 42 in electrical communication with the electronic control pack 32 provides a back up power source, especially designed for use by a break away switch 44.

The break away switch 44 is a normally closed switch that is held open by a pin, or connector, affixed to the towing vehicle 12. If, for any reason, the towing vehicle 12 and the towing vehicle 14 disconnect, the pin, or connector, will disengage from the break away switch 44. The switch 44 will then move to the closed position immediately sending a signal to apply the trailer brakes 40. Thus, if the towed vehicle 14 breaks away from the towing vehicle 12, the trailer brakes 40 will immediately stop the towed vehicle 14.

The electronic control pack 32 uses a specific algorithm to control the function of the electro-hydraulic power unit 34, which in the preferred embodiment comprises an electronic piston motor. For an initial period of time, the towed vehicle brake controller 30 sends a 12 v signal to the electro-hydraulic power unit 34 signaling it to operate at full speed. After the initial period of time, the electronic control pack 32 reduces the signal to between 8–10 v signaling the electro-hydraulic power unit 34 to ramps down to less than full speed. In the preferred embodiment, the initial period of time comprises between about 0.7 and bout 1 second, at which the electro-hydraulic power unit 34 operates at full speed. After this period of time the speed is reduce to between about 75% an about 83% of full speed. This algorithm provides for nearly instantaneous response by the trailer brakes 40, and reduces the overall draw or drain on the electrical system. In addition, due to the fact that it usually takes more power to initially pressurize the brake lines than it takes to maintain the pressure, the algorithm can maintain a high brake pressure with a minimal amount of power and reduces the amount of heat generated that can effect the viscosity of the brake fluid.

Another advantage of the present invention comprises the use of the proportional relief valve 36. As compared to systems that use pressure drop over a fixed orifice, the proportional relief valve 36 does not induce heat related instability. Since the proportional relief valve 36 uses a self-adjusting poppet and seat, it maintains a relatively constant pressure regardless of changes in viscosity. Thus, the present invention is better at controlling and maintaining a desired brake pressure than prior art systems.

The present invention is designed for use with a variety of different types of towed vehicle brake controller 30 systems. These include a pre-selected pressure (standard electric brake controller) electronic controller, a plug-and-go electronic controller, a dedicated system, and a bi-lateral electronic tongue braking system. In other words, the vehicle brake controller 30 can vary and still function seamlessly with the other components of the brake actuating system 10. In this manner, the system 10 can be used in conjunction with commercially available controllers/systems, or with specifically designed proprietary controllers/systems.

The pre-selected electronic controller consists of a controller unit that provides a constant pre-selected pressure to the towing vehicle brakes 40 regardless of the pressure applied to the brake pedal of the towing vehicle 12. These systems also can incorporate an in-cab manual override mechanism that allows the operator of the towing vehicle 12 to apply the towed vehicle 14 brakes 40 directly.

The plug-and-go controller utilizes a proportional signal that can be sent to the towed vehicle controller 32, that is generated from a deceleromator chip incorporated into the towed vehicle controller 32. The deceleromator produces a signal that varies in proportion to the deceleration of the towing vehicle 12. The system is activated by application of the towing vehicles 12 brake lights, and could include an in-cab manual override switch.

The dedicated system essentially comprises a proprietary system dedicated to a specific towing and towed vehicle 12, 14 combination. A pressure transducer placed in the braking line of the towing vehicle 12 produces a proportional braking signal for use by the electronic control pack 32 on the towed vehicle 14. The ratio or proportionality of the towing vehicle 12 brake pressure applied in response to the signal can and will vary based on specific load and road conditions. Again, a manual in-cab override can also be provided.

The bi-lateral electronic tongue coupler braking system utilizes strain sensors located in the coupler 48 between the towing vehicle 12 and the towing vehicle 14 provide a proportional braking signal based on lateral forces exerted on the coupler 48.

Each of the four systems can also utilize anti-lock brake technology while still falling within the scope of systems contemplated for use with the present invention. Anti-lock braking systems utilize a speed monitor typically attached to the wheels of the towed vehicle 14). The monitor detects a wheel lock-up and modulates brake pressure proportionally to allow for a constant and uniform deceleration.

Figure 3:
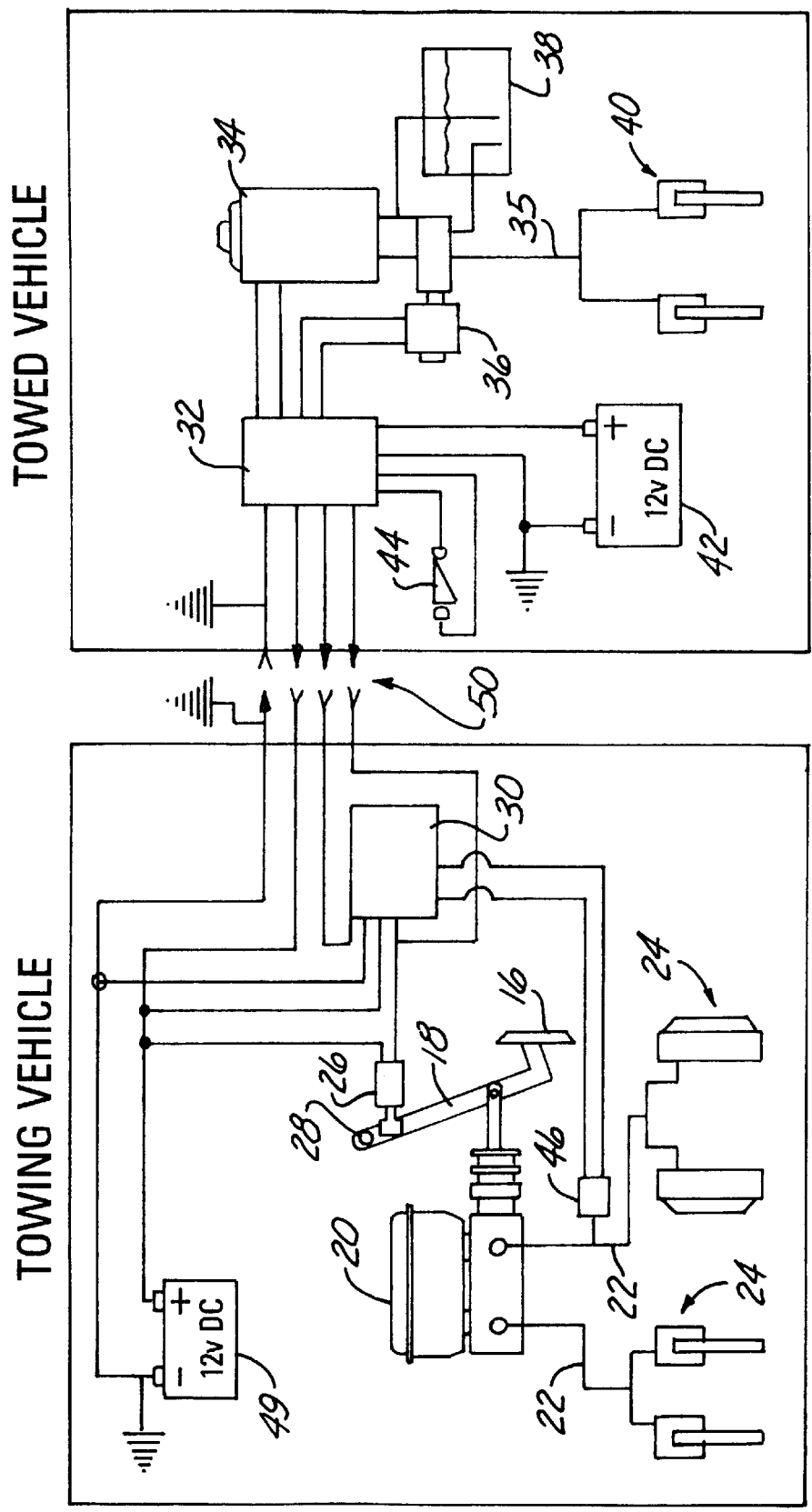
FIG. 3 is a schematic of an alternative hydraulic brake actuating system.

The configuration of the invention changes very little with changes in the type of controller system utilized. FIG. 2 and FIG. 3 show embodiments of the invention essentially identical and adaptable for any of the four systems described hereinabove, except, however, FIG. 3 includes a pressure transducer 46 for use with the dedicated system.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

What is claimed is:

1. A towing and towed vehicle braking system, said system comprising:

a towing vehicle having brakes in operable communication with a towing vehicle electronic brake controller capable of transmitting a brake signal indicating application of said towing vehicles brakes;

a towed vehicle coupled to said towing vehicle having brakes in operable communication with an towed vehicle electronic brake controller capable of receiving said brake signal from said towing vehicle electronic brake controller;

brake lines leading to said towed vehicle brakes;

a power unit in operable communication with said towed vehicle brake controller and said brakes lines, for providing a power source to pressurize said brake lines;

a brake fluid reservoir in operable communication with said power unit and said brake lines, for storage and transfer of brake fluid;

a proportional relief valve in operable communication with said power unit, said towed vehicle brake controller, said brake lines, and said brake fluid reservoir, for controlling the pressure in said brake lines and thereby controlling braking force applied by said towed vehicle brakes;

wherein said proportional relief valve is sent a specific pressure setting by said towed vehicle brake controller set in response to said brake signal from said towing vehicle electronic brake controller thereby controlling the application of said towed vehicle brakes in response to said towing vehicle brakes; and wherein said towed vehicle brake controller signals said power unit to operate at full power for a first period of time, and at a reduced power for a second period of time.

2. The invention in accordance with claim 1 wherein said first period of time is between about 0.7 seconds and about 1.0 seconds.

3. The invention in accordance with claim 1 wherein said reduced power is between about 83% and about 75% of said full power.

4. The invention in accordance with claim 1 further comprising a break away switch in operable communication with said towed vehicle brake controller and with said towing vehicle, such that if said towed and towing vehicle separate said break away switch sends a signal to said towed vehicle brake controller to apply said towed vehicle brakes.

5. The invention in accordance with claim 1 wherein said brake signal is sent from a brake light switch triggered upon application of said towing vehicle brake.

6. The invention in accordance with claim 1 wherein said brake signal from said towing vehicle brake controller indicates a constant pre-selected pressure.

7. The invention in accordance with claim 1 wherein said brake signal from said towing vehicle brake controller is in proportion to deceleration of said towing vehicle.

8. The invention in accordance with claim 1 wherein said brake signal from said towing vehicle brake controller is from a pressure transducer on said towing vehicle.

9. The invention in accordance with claim 1 wherein said brake signal from said towing vehicle is from a strain sensor mounted in a coupler that couples said towing vehicle and said towed vehicle.

10. The invention in accordance with claim 1 wherein said towing vehicle brakes are anti-lock brakes.

11. The invention in accordance with claim 1 wherein said brake signal is a proportional brake signal, and wherein said specific pressure setting is in proportion to said proportional brake signal.

* * * * *